E. SONSTADT.
Manufacture and Purification of Magnesium.
No. 45,684. Patented Dec. 27, 1864.
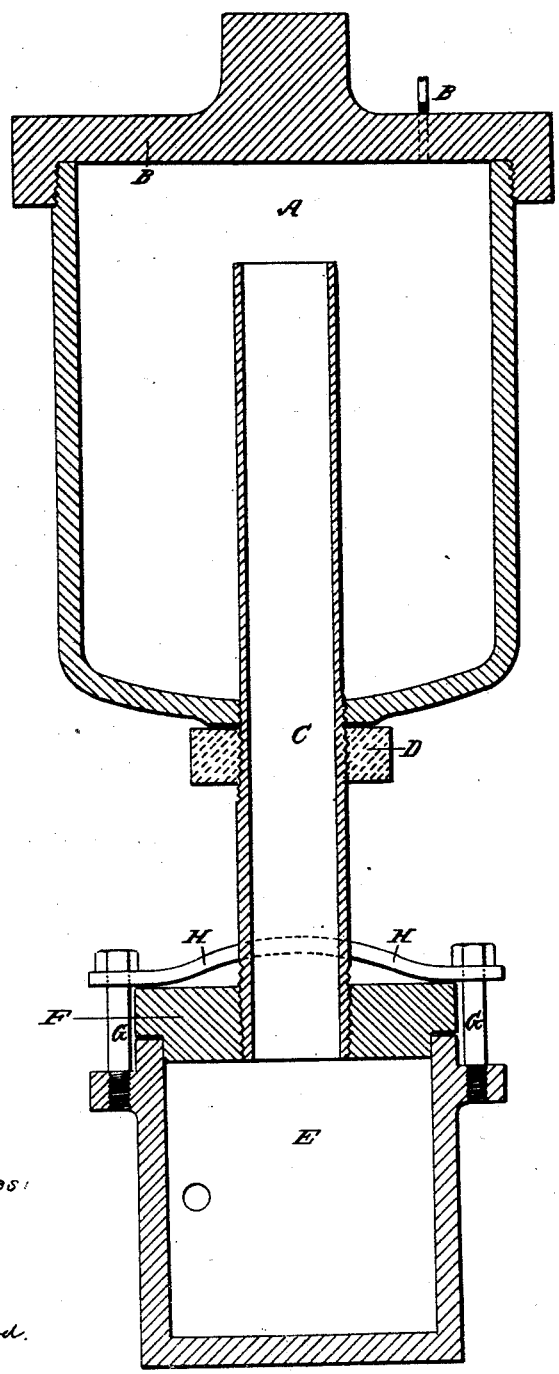
Witnesses:
Wm Hutton
H Hughes
Henry M Ormerod.
Inventor:
E. Sonstadt.

UNITED STATES PATENT OFFICE.

EDWARD SONSTADT, OF LOUGHBOROUGH, ENGLAND.

IMPROVEMENT IN THE MANUFACTURE AND PURIFICATION OF MAGNESIUM.

Specification forming part of Letters Patent No. 45,684, dated December 27, 1864.

*To all whom it may concern:*

Be it known that I, EDWARD SONSTADT, of Loughborough, in the county of Leicester, England, a subject of the Queen of Great Britain, have invented or discovered new and useful Improvements in the Manufacture and Purification of the Metal Magnesium; and I, the said EDWARD SONSTADT, do hereby declare the nature of the said invention and in what manner the same is to be performed to be particularly described and ascertained in and by the following statement thereof—that is to say:

This invention has for its object improvements in the manufacture and purification of the metal magnesium.

In the specification of a patent granted to me I have described a process of manufacturing magnesium by acting, by means of sodium, on a material obtained by evaporation to dryness, and then heating to redness a mixture in solution of chlorides of magnesium with chlorides of sodium. I have since found that in the preparation of this material chloride of potassium may be advantageously substituted for chloride of sodium. I take chloride of magnesium obtained in a properly pure state, as is described in the specification of my said former patent, and I add to the solution thereof chloride of potassium carefully freed from contamination with sulphuric acid, as in the former specification is directed in respect to chloride of sodium. The process is carried on as before, subject only to the following observations. Good results may be obtained by using the potassium salt anywhere between the limits of one-third of an equivalent of the chloride of potassium to one equivalent of the chloride of magnesium and one atom of each salt. There is least waste and least escape of hydrochloric-acid gas during the ignition by using the proportion of atom to atom; but in some cases this mixture might be found inconveniently bulky in proportion to the quantity of magnesium contained in the material. The quantity of sodium to be used should be adjusted to the quantity of magnesium estimated to be in the material, using two parts sodium for each one estimated part of magnesium; or rather less sodium than this may be used with advantage.

In order to purify metallic magnesium, I distill in a peculiar apparatus which I will proceed to describe: It consists of two vessels connected together by a pipe or passages. These vessels are both capable of being closed airtight, and during the process of distillation they are so closed. One of these vessels is placed in a furnace and surrounded by the fuel. In this vessel the magnesium is contained. The other vessel, which is immediately below it, is fitted into a recess formed for it in the fire-grating or bars of the furnace, and it projects below. The crude magnesium having been placed in the upper vessel and the apparatus closed so that the joints shall be airtight, a current of dry hydrogen gas is passed through the two vessels, there being a small aperture left in each vessel for this purpose. When the whole of the air has been swept out these apertures are closed by driving in steel plugs; but there is a small passage left in the plug of the lower vessel, so that when the apparatus is heated and the gas expands the excess may be able to escape. This passage can be closed with a wire, which is made to fit it nicely. The apparatus being charged and ready, the fire is lighted around it, and the hydrogen, as it escapes from the before-mentioned small passage or orifice, is ignited and allowed to burn as long as it will, and the passage or orifice is then closed by means of the wire. The lower vessel is during the process kept cool by mopping externally with water. The vessel containing the magnesium should be heated to a very bright red, approaching a white heat, but not higher than the vessel can conveniently bear, and it is maintained at this heat for a sufficient time, which will be known by the lower vessel becoming cooler than it was at the commencement of the process, notwithstanding that the heat of the furnace is maintained. The operation being complete, the apparatus is withdrawn from the furnace and cooled. It is then taken apart, and the magnesium will be found in a more or less solid mass in the lower vessel.

The gray or blackish mass, rich in magnesium, described in the above-mentioned specification as a product remaining at the bottom of the iron crucible in which the metal is reduced, may be distilled precisely as is above directed for crude lump magnesium. A portion of the flux usually distills over with the magnesium; but this does not prevent the latter from agglomerating into lumps or globules in the receiver more or less considerable. The flux must be washed away by water from the metal thus distilled, and the metal, which is apt to be brittle, may be redistilled in order to obtain it in a soft condition suitable for manufacturing purposes. The apparatus need not be filled with hydrogen for this purpose; but a hole must be left in the receiver for the escape of gas, and after this is burned away the hole must be stopped up, as directed in the distillation of the lump metal.

The annexed drawing shows the form of apparatus which I prefer. It is made entirely of iron.

A is the upper vessel, into which the crude magnesium is placed. B is a cover screwed onto this vessel, and B' is a passage in this cover capable of being closed by a screw-plug.

C is a tube passing up within the vessel A. It is screwed into the bottom thereof and made perfectly tight by means of a lock-nut, D.

E is the lower vessel. It has a cover, F, which is screwed tightly onto the bottom of the tube C. The cover F is secured to the vessel E by lugs, which receive the bolts G of the cross-piece H.

I have found it convenient in practice in all cases to submit the crude magnesium to two distillations, the first to separate the sodium and fixed impurities and second to complete the purification. It is convenient to use different apparatus of slightly-different form for the two operations. For the first distillation the lower vessel, E, is deep, so as to project a considerable distance below the fire-bars, and hence remains comparatively cool. The sodium comes over first and forms a distinct layer, and the magnesium vapor condenses as it enters the vessel E and solidifies in drops, which adhere together, forming a porous mass. The sodium is readily separated from the mass by washing it with water. For the redistillation the vessel E is made much shallower, so that, although considerably cooler than the upper vessel, A, it may remain throughout the process at a low red heat. The magnesium is then obtained in the form of a solid cast cake. If two separate distilling operations be not resorted to, the sodium should be separated by other means before the distillation.

It is not essential that the air should be expelled from the distilling apparatus by means of hydrogen, but it is very advantageous so to do; or a few drops of water may be put in the upper vessel containing the crude metal. The decomposition of the water during the heating furnishes enough hydrogen for the process and answers very nearly as well.

Having thus described the nature of my said invention and the manner of performing the same, I would have it understood that what I claim is—

1. The manufacture of the metal magnesium by acting, by means of sodium, on a material obtained by evaporating to dryness and then heating to redness a mixture in solution of chloride of magnesium with chloride of potassium, substantially as described.

2. The distillation of metallic magnesium by means of an apparatus made of iron, from which atmospheric air is excluded during the distilling process, such apparatus consisting of a receiver placed immediately beneath the fire-bars of the furnace which heats the vessel containing the crude metal, so that the receiver may, when required, be heated sufficiently to keep the magnesium which distills over in a fused or liquid state, and so that the pipe connecting the two vessels may be kept sufficiently hot to prevent the condensation of magnesium in it, substantially as herein described.

E. SONSTADT.

Witnesses:
WM. HULNY,
*Clerk to Messrs. Charlewood & Ormerod, Solrs., Manchester.*
WM. HUGHES,
*Yarn Agent, New Market Lane, Manchester.*